(12) United States Patent
Norris et al.

(10) Patent No.: US 7,561,634 B2
(45) Date of Patent: Jul. 14, 2009

(54) CONTINUOUS PHASE MODULATION SYSTEM AND METHOD WITH ADDED ORTHOGONAL SIGNALS

(75) Inventors: James A. Norris, Fairport, NY (US); John W. Nieto, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 829 days.

(21) Appl. No.: 10/868,430

(22) Filed: Jun. 15, 2004

(65) Prior Publication Data

US 2005/0276345 A1 Dec. 15, 2005

(51) Int. Cl.
*H04L 27/00* (2006.01)
(52) U.S. Cl. ............. 375/295; 375/265; 332/104; 332/144
(58) Field of Classification Search ................. 375/265, 375/295; 332/144, 106; 322/106, 144
See application file for complete search history.

(56) References Cited

U.S. PATENT DOCUMENTS

| | | | | |
|---|---|---|---|---|
| 4,995,052 | A | 2/1991 | Thorvaldsen | 375/1 |
| 5,048,058 | A | 9/1991 | Kaleh | 375/47 |
| 5,627,856 | A | 5/1997 | Durrant et al. | 375/209 |
| 5,771,223 | A * | 6/1998 | Kimura et al. | 370/203 |
| 6,466,630 | B1 | 10/2002 | Jensen | 375/327 |
| 6,813,485 | B2 * | 11/2004 | Sorrells et al. | 455/313 |
| 7,072,414 | B1 * | 7/2006 | Lui et al. | 375/274 |
| 2002/0095594 | A1 | 7/2002 | Dellmo et al. | 713/200 |
| 2005/0068096 | A1 * | 3/2005 | Yoon | 329/304 |
| 2006/0056280 | A1 * | 3/2006 | Ido et al. | 370/208 |

FOREIGN PATENT DOCUMENTS

WO 03/036819 1/2003

OTHER PUBLICATIONS

Graser, "Techniques for improving power and bandwidth efficiency of UHF MILSATCOM waveforms", Military Communications Conference, 2001. MILCOM 2001. Communications for Network-Centric Operations: Creating the Information Force. IEEE Publication Date: 2001 vol. 1, pp. 653-657 vol. 1.*

(Continued)

*Primary Examiner*—Juan A Torres
(74) *Attorney, Agent, or Firm*—Allen, Dyer, Doppelt, Milbrath & Gilchrist, P.A.

(57) ABSTRACT

A system and method of the present invention forms a hybrid encoded signal. A signal generator generates a coded waveform having a trellis structure, such as a continuous phase modulated signal. A modulator is operative with the signal generator and adds at least one orthogonal or amplitude modulated waveform to a trellis structure of the coded waveform to create a non-constant envelope modulated signal that has at least one of increased bandwidth, improved bit error rate, or an increased number of bits encoded into a single symbol.

60 Claims, 8 Drawing Sheets

OTHER PUBLICATIONS

Yilmaz, "Turbo coded continuous phase modulation", Military Communications Conference, 2001. MILCOM 2001. Communications for Network-Centric Operations: Creating the Information Force. IEEE pp. 1405-1409.*

Norris, "Data throughput on MILSATCOM channels using military standard 188-184 and 188-181B", Military Communications Conference, 2003. MILCOM 2003. IEEE vol. 1, Oct. 13-16, 2003 pp. 493-498 vol. 1.*

Norris, "Low power method for demodulation of continuous phase modulated (CPM) waveforms", MILCOM 2002. Proceedings vol. 2, Oct. 7-10, 2002 pp. 007-1011 vol. 2.*

Norris, "Performance of MIL-STD-188-181C CPM SATCOM with Reduced State Demodulation", Military Communications Conference, 2006, MILCOM 2006, Oct. 23-25, 2006 pp. 1-4.*

Norris, "On the use of orthogonal signals to generate parallel branches and improve the spectral efficiency of CPM and TCM modulation", Wireless Communications and Networking Conference, 2005 IEEE vol. 2, Mar. 13-17, 2005 pp. 1072-1078 vol. 2.*

Norris, "An investigation of phase pulse shape diversity to generate parallel branches, increase data rate, and reduce the complexity of CPM modulation", Wireless Communications and Networking Conference, 2005 IEEE vol. 2, Mar. 13-17, 2005 pp. 836-842 vol. 2.*

* cited by examiner

CONTINUOUS PHASE MODULATION SYSTEM AND METHOD WITH ADDED ORTHOGONAL SIGNALS

FIELD OF THE INVENTION

The present invention relates to the field of communications systems, and more particularly, the present invention relates to communications systems and related methods that use continuous phase modulation and similar modulation schemes.

BACKGROUND OF THE INVENTION

Some multi-band or other tactical radios operate in the high frequency (HF), very high frequency (VHF) (for satellite communications), and ultra high frequency (UHF) bands. The range of multi-band tactical radios can operate over about 2 through about 512 MHz frequency range. Next generation radios should cover about 2.0 to about 2,000 MHz to accommodate high data rate waveforms and less crowded frequency bands. This high frequency transmit mode is governed by standards such as MIL-STD-188-141B. UHF standards, on the other hand, provide different challenges over the 225 to about 512 MHz frequency range, including short-haul line-of-sight (LOS) communication and satellite communications (SATCOM) and cable. This type of propagation can be obtained through different weather conditions, foliage and other obstacles making UHF SATCOM an indispensable communications medium for many agencies. Different directional antennas can be used to improve antenna gain and improve data rates on the transmit and receive links. This type of communication is typically governed in one example by MIL-STD-188-181B, which provides calculation for higher transmit power and lower receive noise figures and other waveforms.

The joint tactical radio system (JTRS) has different designs that use oscillators, mixers, switchers, splitters, combiners and power amplifier devices to cover different frequency ranges. These modulation schemes used for these types of systems can occupy a fixed bandwidth channel at a fixed frequency spectrum. The systems usually include a memory of a coded waveform, such as a phase shift keying (PSK), amplitude shift keying (ASK), frequency shift keying (FSK), quadrature amplitude modulation (QAM), or continuous phase modulation (CPM) with a convolutional or other type of forward error correction code, for example, represented as a trellis structure. It should be understood that PSK, ASK, QAM and non-continuous FSK are memoryless modulations. For these modulations to have memory, Trellis-coded Modulation would need to be used for each specific M-PSK, M-QAM, M-ASK modulation type.

Throughout the communication industry, a requirement exists to improve power and spectral efficiency of a given modulation type, such as the PSK, ASK, FSK, CPM and QAM. A current industry standard uses filtering and other methods to eliminate any unnecessary out-of-band energy and improve the spectral efficiency and various forward error corrections (FEC) schemes and improve the power efficiency. The primary limitation these schemes include is the receiver demodulation complexity.

It would be advantageous if the distance property of uncoded, transmitted bits could be increased while taking advantage of any underlying memory (coding) scheme of those bits/symbols which are most likely to be received in error.

SUMMARY OF THE INVENTION

The present invention is applicable to communication systems and products in general and particularly systems that require modulation schemes that occupy a fixed bandwidth channel (LOS, cable or SATCOM) (fixed frequency spectrum). This invention takes advantage of the memory (usually represented as a trellis structure) of a coded waveform (i.e., TCM M-PSK, TCM M-ASK, continuous FSK, TCM M-QAM, or CPM with a convolutional (or other type) FEC code) with a novel technique to increase the bandwidth of the signal and either improve the bit error rate performance or increase the number of bits which can be encoded into a single symbol.

The addition of orthogonal or pseudo-orthogonal modulated waveforms (i.e., sin (ft/T), sin (2ft/T), PN spread sequences, etc.) increases the distance property of uncoded, transmitted bits while taking advantage of the underlying memory (coding) scheme of those bits/symbols which are most likely to be received in error. The amplitude modulated waveforms would provide discrimination to differentiate between different amplitude signals. In this approach, the orthogonal or pseudo-orthogonal signals are added to the signal space of a modulation type to create a new, hybrid signal. The demodulation of this hybrid signal requires some modification to the receiver for optimal performance but does not effect the complexity of the original trellis decoder. Thus, the receiver complexity is not greatly increased. The addition of one orthogonal (or pseudo-orthogonal) waveform to a CPM-encoded signal is advantageous. This hybrid approach can be used with any modulation type which takes advantage of modulation or channel memory.

In accordance with the present invention, a system and method forms an encoded signal and uses a signal generator for generating a coded waveform having a trellis structure. A modulator is operative with the signal generator and adds at least one orthogonal or pseudo-orthogonal waveform to a trellis structure of the coded waveform to create a non-constant envelope modulated signal that has increased bandwidth, improved bit error rate, or an increased number of bits encoded into a single symbol. The modulator is operative for amplitude shaping the coded waveform with integer or non-integer frequency multiples of amplitude modulated signals. A demodulator employs a Fast Fourier Transform (FFT) and branch metrics and discriminates between amplitude modulated signals. It is also operative for increasing the number of cycles per symbol for a pair of amplitude modulated signals, increasing higher order modulation within the encoded waveform by increasing orthogonal symbols, and generating a symbol alphabet using a sum of orthogonal frequencies.

In an example of the present invention, the modulator is operative for creating a multiple-ary encoded waveform using multiple-ary symbols and at least one extra-encoded amplitude modulated bit. The multiple-ary encoded waveform could include a Sin (Fs/2) or Sin (Fs) amplitude shape. It is also operative for changing a phase offset per symbol to provide sufficient distance for a parallel path to work with a trellis structure and increasing the distance between constellation points in the trellis. Higher orthogonal signals can be created using a sum of orthogonal signals (Sin (Fs)+Sin (2Fs)).

In another aspect of the present invention, the signal generator is operative for generating a continuous phase modulated signal and sine amplitude shaping the signal to create the non-constant envelope continuous phase modulated signal.

In one aspect of the present invention, a constant radius continuous phase modulated signal shape can be replaced with about a one-half sine wave, i.e., 0.0, about 0.7, about 1.0, about 0.7, and about 0.0 amplitude. The radius can be equal to a constant minus the amplitude shape for clockwise symbols or a constant plus an amplitude shape for counter-clockwise symbols.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
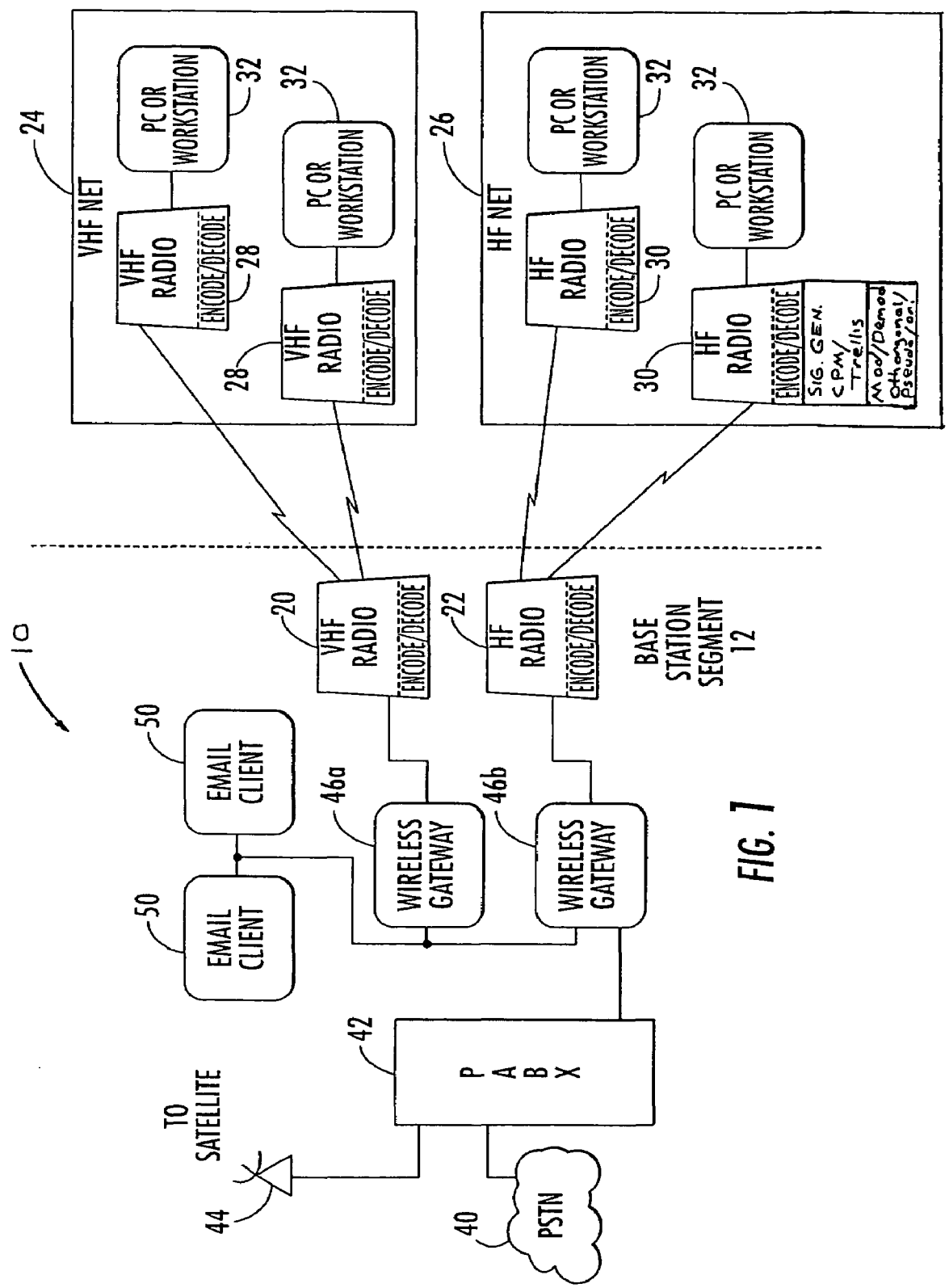
FIG. 1 is a block diagram of a communications system that could be used with the present invention as a non-limiting example.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The present invention is applicable to communication systems and products in general and particularly systems that require modulation schemes that occupy a fixed bandwidth channel (LOS, cable or SATCOM) (fixed frequency spectrum). The present invention can take advantage of the memory (usually represented as a trellis structure) of a coded waveform (i.e., PSK, ASK, FSK, QAM, or CPM with a convolutional (or other type) code) with a novel technique to increase the bandwidth of the signal and either improve the bit error rate performance or increase the number of bits which can be encoded into a single symbol. PSK, ASK, and QAM are memoryless modulations, unless the symbols are generated by a TCM code. The present invention is applicable to memory or memoryless applications.

The addition of orthogonal or pseudo-orthogonal waveforms (e.g., sin (ft/T), sin (2ft/T), PN-sequences, etc.) increases the distance property of uncoded, transmitted bits while taking advantage of the underlying memory (coding) scheme of those bits/symbols which are most likely to be received in error. The amplitude modulated signals are such that they provide discrimination between different amplitude modulated signals. In this approach, the orthogonal or pseudo-orthogonal signals are added to the signal space of a modulation type to create a new, hybrid signal. The demodulation of this hybrid signal requires some modification to the receiver for optimal performance but does not effect the complexity of the overall forward error correction. Thus, the receiver complexity is not greatly increased. The addition of one orthogonal or amplitude modulated waveform to a CPM-encoded signal is advantageous. This hybrid approach can be used with any modulation type which takes advantage of modulation or channel memory.

The present invention provides a reduced bandwidth continuous phase modulated (CPM) waveform, which is interoperable with a standard 1REC CPM modulation (no receiver modifications required for optimal demodulation performance). The trellis structure has the same number of states as a 1REC CPM. For example, 1REC multi-h {4/16, 5/16} CPM. It replaces the baseband signal of standard CPM (CPFSK), in accordance with cos (2pi*fc+2pi*h*θm(t)dt).

In accordance with one aspect of the present invention, it is possible to transect each phase position using linear interpolation. First, each coordinate is converted to Cartesian coordinates as follows: $(x,y)_\theta = (\cos(\theta), \sin(\theta))$ and $(x,y)_\theta = (\cos(\theta), \sin(\theta))$. The line segment increment is calculated based on N samples per symbol.

An intuitive understanding of NCE performance leads to the conclusion that if reducing the distance between constellation points reduces the spectrum and BER performance, then increasing the distance would have a corresponding increase in the spectrum and an improvement in BER performance. Many methods could be used to increase physical distance between adjacent constellation points. Viterbi (maximum likelihood) demodulation complexity would remain unchanged.

For example, with sine amplitude signal shaping, the constant radius CPM shape is replaced with a half sine wave [0.0, 0.7071, 1.0, 0.7071, 0.0] amplitude, which is true, of course, for a specific number of samples per symbol. For all clockwise symbols {−3 and −1}, the system could use a radius that is equal to a constant minus the amplitude shape, i.e., radius=0.8*rho−0.2* shape. For all counter-clockwise symbols {+3 and +1}, the system could use a radius that is equal to a constant plus the amplitude shape, i.e., radius=0.8*rho+0.2* shape.

In the present invention, amplitude shaping is not limited to +/−½ sine. Other amplitude shapes could include +/−1 sine (one full cycle of a sine wave between each constellation point), and +/−2 sine and similar, or a PN sequence could be used. So far, a standard 1REC CPM demodulator could be used (with some loss in performance). Performance improvement can be achieved through an increase in amplitude weight and the use of a matched receiver (radius=0.5*rho+/−5* shape).

Diversity of amplitude shaping can be used to provide increased bit density. An 8-ary waveform can be created using a single bit to choose which of two orthogonal amplitude shapes to transmit. For example, bit=0=>+½ sine or +1 sine, and bit=1=>−½ sine or −1 sine.

Multi-amplitude CPM, on the other hand, has a narrower frequency spectrum than 1REC CPM (and hybrid NCE CPM). Multi-amplitude CPM also has a corresponding loss in performance.

Hybrid NCE CPM waveforms do not increase maximum likelihood receiver trellis complexity, although branch metric calculation complexity increases in proportion to complexity of hybrid amplitude shaping. Hybrid amplitude shaping is not limited to CPM. A QAM constellation, for example, could use the same amplitude shapes to traverse each constellation position.

FIG. 1 is a high level block diagram of a communications system 10 that includes a base station segment 12 and wireless message terminals that could be modified for use with the present invention. The base station segment 12 includes a VHF radio 20 and HF radio 22 that communicate and transmit voice or data over a wireless link to a VHF net 24 or HF net 26, each which include a number of respective VHF radios 28 and HF radios 30, and personal computer workstations 32 connected to the radios 28, 30. The base station segment 12 includes a landline connection to a public switched telephone network (PSTN) 40, which connects to a PABX 42. A satellite interface 44 such as a satellite ground station, connects to the PABX 42, which connects to processors forming wireless gateways 46a, 46b. These interconnect to the VHF radio 20 or HF radio 22, respectively. The processors are connected through a local area network to the PABX 42 and e-mail clients 50. The radios include appropriate signal generators and modulators.

An Ethernet/TCP-IP local area network could operate as a "radio" mail server. E-mail messages could be sent over radio links and local air networks using STANAG-5066 as second-generation protocols/waveforms (the disclosure which is hereby incorporated by reference in its entirety) and, of course, preferably with the third-generation interoperability standard: STANAG-4538. An interoperability standard FED-STD-1052 (the disclosure which is hereby incorporated by reference in its entirety) could be used with legacy wireless devices. Examples of equipment that can be used in the present invention include different wireless gateway and radios manufactured by Harris Corporation of Melbourne, Fla. This equipment could include RF5800, 5022, 7210, 5710, 5285 and PRC 117 and 138 series equipment and devices as non-limiting examples.

The present invention can be used for modulating radio frequency signals such as used in the AN/PRC-117F(c) multi-band/multi-transmission Radio designed and manufactured by Harris Corporation as part of the Falcon II series of next generation radios. This type of lightweight radio system places a software-based radio and integrates several distinct radios, such as the VHF-FM for combat net radio, VHF-AM for public safety and ground-to-air; and UHF-AM for military ground-to-air and UHF TACSAT communications. It includes integrated crypto functions, including black-key management in a crypto ignition key (CIK). This type of system can cover a wide frequency range of about 30 to about 512 MHz. It includes MIL-STD mandatory modulation modes. It can provide secure interoperability with SINC-GARS-ICOM and other tentacle radios it can interoperate with foreign and domestic radio and tactical data terminal equipment with data rates from about 2,400 BPS to about 64 KBPS. It can include interoperable support for anti-jam operations and can include UHF SATCOM communications from about 243 to about 318 MHz. It can send and receive secure satellite transmissions at data rates of up to 56 kBPS and provide embedded automatic repeat requests (ARQ) system to provide error-free delivery of data packets.

Continuous Phase Modulation and Trellis-Coded Modulation are well-understood schemes that layer trellis codes with multilevel modulation to produce efficient bandwidth waveforms. The present invention is a modulation scheme that takes advantage of existing trellis codes and adds parallel branches to create a new modulation with greater spectral efficiency and reduced receiver complexity. The present invention is the trade-off between Euclidean distance and modulation bandwidth for the standard 1-REC CPM waveform.

A set of orthogonal signals can be added to the CPM constellation, which will provide a series of parallel branches in the natural trellis structure of the CPM modulation. This novel and unobvious non-constant envelope CPM waveform is advantageous over a multi-level, multi-amplitude CPM waveform. In similar fashion, a Trellis-Coded, Shaped or standard PSK modulation is expanded to include orthogonal signal shaping and the power and spectral efficiencies are improved.

Continuous Phase Modulation is a constant envelope modulation with time domain representation:

$$s(t) = \sqrt{2E/T} \cos\left(2\pi f t + 2\pi \sum_{i=0}^{n} \alpha_i h_i q(t - iT)\right)$$

T is the symbol period, E is the energy per symbol, f is the carrier frequency, $\alpha$ is the data symbol, h is the modulation index, and q is the phase pulse shape. For CPM modulation the phase pulse 1, the modulation index can be used to reduce the bandwidth of the modulated signal. With rectangular (linear) pulse shaping the CPM waveform is denoted as 1REC CPM or CPFSK. As an illustration of the process of generating a hybrid CPM signal, an initial example of a CPFSK modulation will be used. The multi-h (4/16, 5/16) 1REC CPM defined in MIL-STD-188-181B is explained in U.S. Department of Defense, "Interoperability Standard for Single-Access 5 kHz and 25 kHz UHF Satellite Communications Channels," MIL-STD-188-181B, 20 Mar. 1999, will be modified with orthogonal signal amplitude shapes. The resulting spectral and power efficiencies are set forth in greater detail below. With amplitude shaping, the trellis structure of the basis (CPM) waveform is unaffected and the hybrid waveform has the same 32 state trellis structure as standard CPM. The metric computation of the hybrid waveform must be modified to correlate for the hybrid's orthogonal signals and the Maximum Likelihood Decoder (used for CPM demodulation) is also used for the hybrid waveform.

Standard 1REC CPM waveforms have well understood spectral efficiency. The bandwidth of the modulation is driven by symbol rate, modulation index (h value), and the size of the symbol alphabet (M values).

Figure 2:
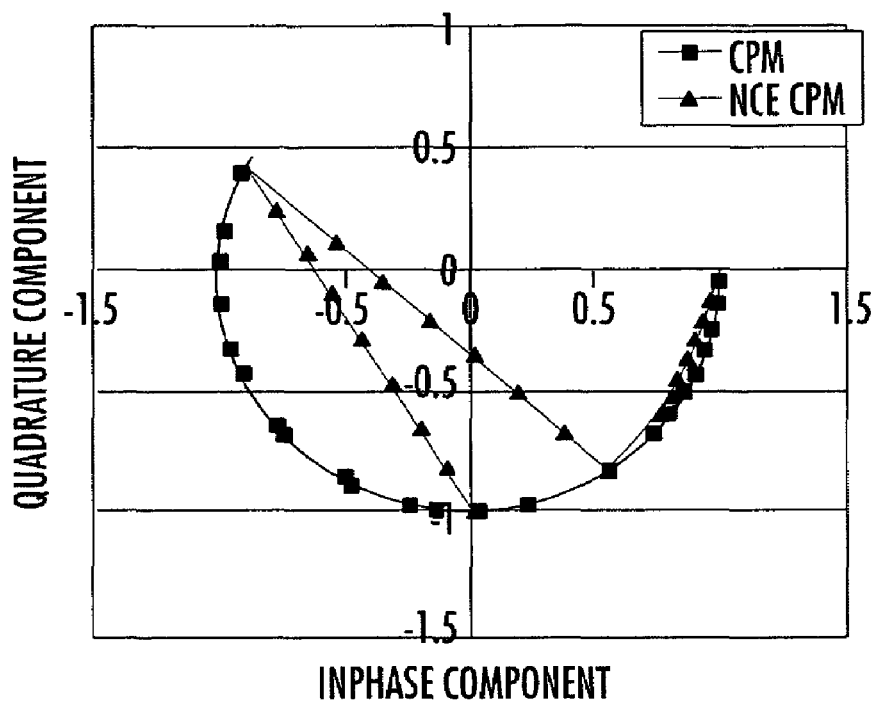
FIG. 2 is a graph showing a constellation comparison for three symbols of 1REC CPM and non-constant envelope CPM.

To gain an intuitive understanding of the affect of the amplitude shape of the CPM pulse and its relation to the bandwidth of the 1REC CPM waveform, the constant envelope shaping of the CPM waveform could be eliminated as shown in FIG. 2, which shows a constellation comparison for three symbols of 1REC CPM and non-constant envelope CPM.

Rather than a signal amplitude which transcribes the outline of the unit circle, the signal could be modified to directly traverse from phase constellation point to the next phase constellation point. The resulting modulation is a non-constant envelope CPM waveform (NCE CPM). Unlike standard CPM, this modulation has a non-zero peak to average ratio and will require the use of a linear amplifier for transmission.

This type of amplitude shaping will not work well for CPM modulation indices where: $((M-1)*h>\pi)$. One issue would be that the resulting constellation could have ambiguous frequency pulses. For example, for a 4-ary CPM modulation with $h=\frac{1}{2}$, the maximum frequency pulse would have the value of 3/2 which would result in a signal that would have the exact same frequency pulse as a –h symbol, even in cases without the exact phase match between 3 h and –h, the calculated metric performance degrades (where $3*h>2*\Pi$) because the generated symbols are very similar in branch metric performance.

Figure 3:
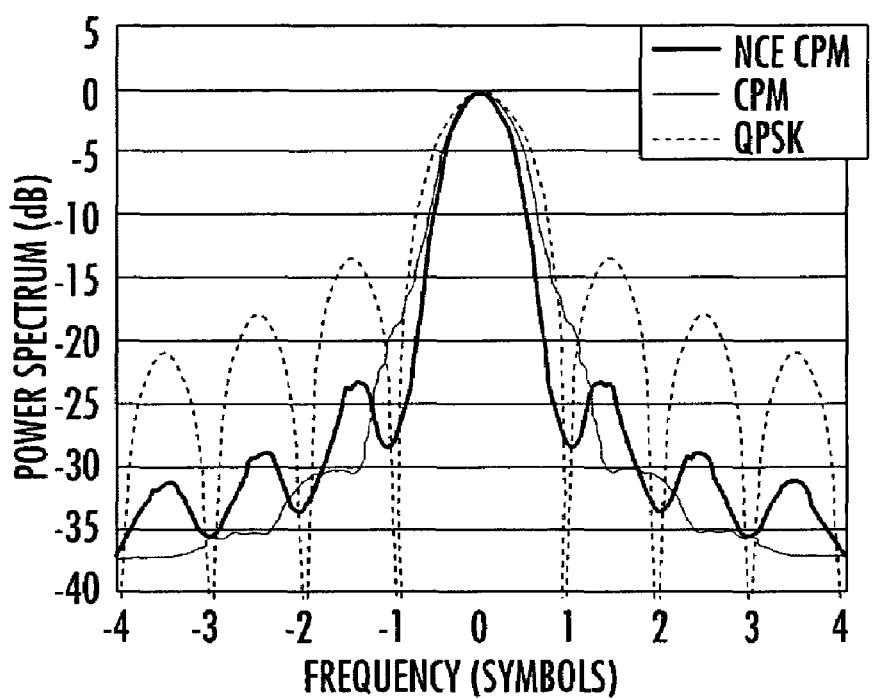
FIG. 3 is a graph showing a comparison of 1REC CPM with non-constant envelope CPM and QPSK.

The largest frequency produced by this non-constant envelope CPM is reduced and has the spectrum shown in FIG. 3, which shows a comparison of 1REC CPM with non-constant envelope CPM and QPSK.

Figure 4:
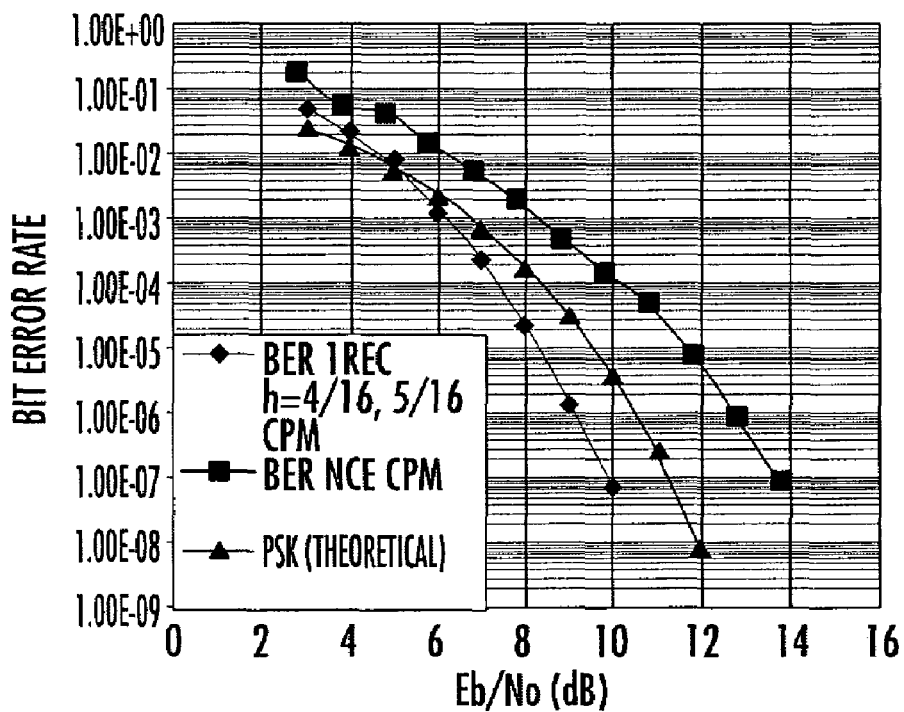
FIG. 4 is a graph showing a performance comparison for NCE CPM, 1REC CPM and QPSK.

In the comparison, the 1REC CPM chosen was a 4-ary multi-h CPM with modulation indices of 4/16, 5/16. The spectrum plot of FIG. 2 demonstrates that the mainlobe of the NCE CPM waveform is narrower than CPM (and QPSK) with higher sidelobes that appear at multiples of the symbol rate. When these sidelobes are filtered off, the power efficiency of the waveform is unaffected and the resulting Eb/No is shown in FIG. 4, which shows a performance comparison for NCE CPM, 1REC CPM and QPSK.

Figure 5:
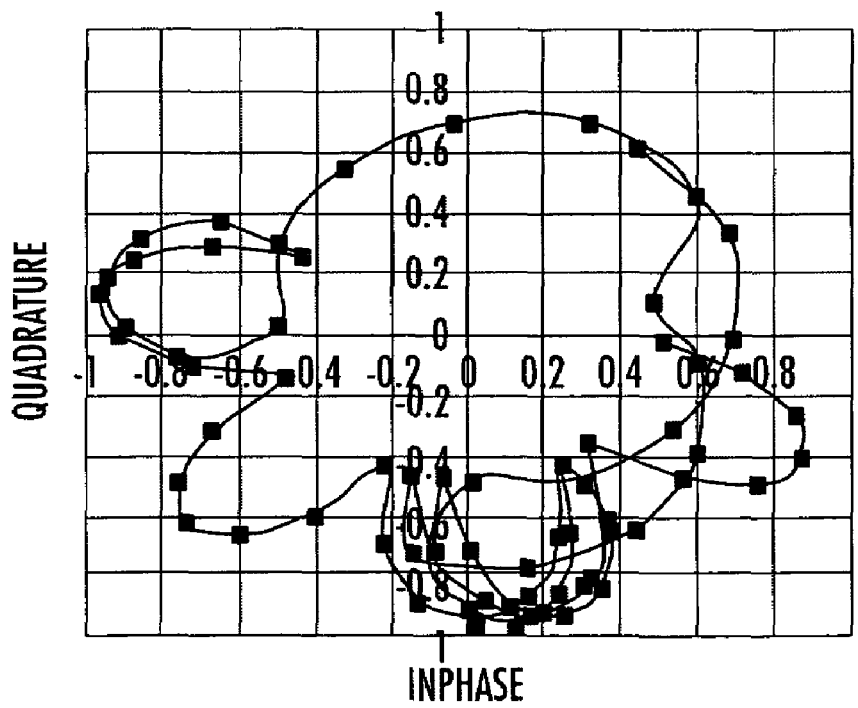
FIG. 5 is a graph showing a constellation diagram of 12 symbols of hybrid CPM modulation.

The degradation in Eb/No performance can be Directly attributed to the loss in Euclidean distance due to the shaping of the non-constant envelope signal. So, the counter argument could be taken-can the power efficiency of the NCE CPM waveform be improved by increasing the minimum Euclidean distance of the CPM branch metrics. The CPM branch metrics are calculated as a correlation between the expected signal and the actual, received signal. Standard methods of improving the cross-correlation properties of signals include the use of orthogonal signals such as pseudorandom noise and frequency-multiple sinusoids. As the next step in the illustration of the development of hybrid CPM, if the direct transaction of each constellation position Were replaced with an amplitude shape of one-half sine wave, the constellation would have the diagram shown in FIG. 5, which shows a constellation diagram of symbols of hybrid CPM modulation.

The constellation (shown in FIG. 5) illustrates a one-half sine wave that replaces the linear phase-to-phase transition. At 4 samples per symbol, the sin (Fs/2) (where Fs represents the symbol period) would have values of 0.0, 0.7071, 1, 0.7071, and 0.0 over the duration of the symbol. The sin (Fs/2) would be added to a constant, $\rho$, which is the value of the normalized unit circle. So the sum of the sine shaping and $\rho$ would equal 1.0. The weighting of the amplitude shaping directly affects the performance and the peak-to-average ratio of the waveform. An analysis was performed with equal weighting and for this weighting, the peak-to-average ratio was measured at 4.5 dB. For equally weighted shape and unit circle, the resulting power efficiency exactly matches the performance of 1REC CPM.

Figure 6:
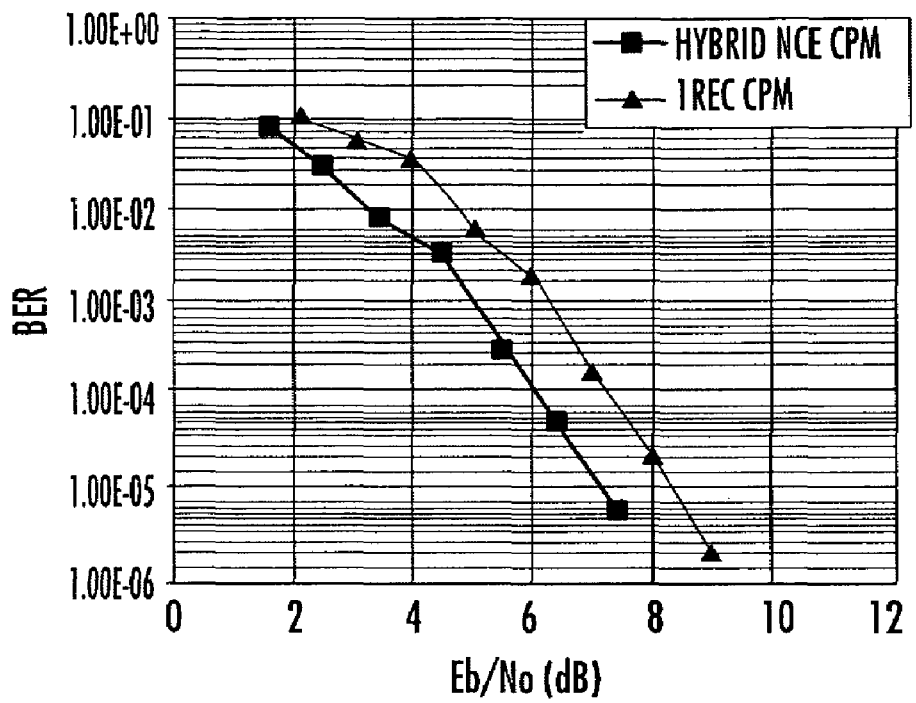
FIG. 6 is a graph showing a performance comparison of hybrid NCE CPM and 1REC CPM.

In the previous example, every symbol is replaced with the same amplitude shaping. But each symbol could be encoded with a different amplitude shape for each symbol. At the receiver, the branch metric calculation is responsible for accounting for the different combinations of phase positions and amplitude shapes. The maximum likelihood decoder then accounts for the amplitude-encoded bits as parallel paths in the path metric computation. So the complexity of the branch metric computation is increased, but the path metric computation is unchanged in complexity other than accounting for the additional incoming nodes. The decoder performs hard decision during the branch metric computation for each possible amplitude shape. Thus, the decoder complexity is increased by the number of bits in the symbol alphabet but not by any modification to the trellis structure. FIG. 6 shows a performance comparison of hybrid NCE CPM and 1REC CPM, and showing the resultant Eb/No curve that results from the following symbol substitution of Table 1:

TABLE 1

| Amplitude Shaping of CPM Symbols | |
| --- | --- |
| Symbol | Amplitude Shape |
| +3 | –sin (Fs) |
| +1 | –sin (Fs/2) |
| –1 | +sin (Fs/2) |
| –3 | +sin (Fs) |

As shown, the power efficiency improves by 1.5 dB. The spectral growth was measured at 50% over the 1REC CPM standard. Instead of using the CPM symbol to indicate the type of amplitude shaping (sin (Fs/2) or sin (Fs), etc.), an extra bit can be encoded using the amplitude shaping of Table 2:

TABLE 2

| Bit Encoding Using Amplitude Shaping | |
| --- | --- |
| AM Bit | Amplitude Shape |
| 0 | –sin (Fs) |
| 1 | +sin (Fs) |

Figure 7:
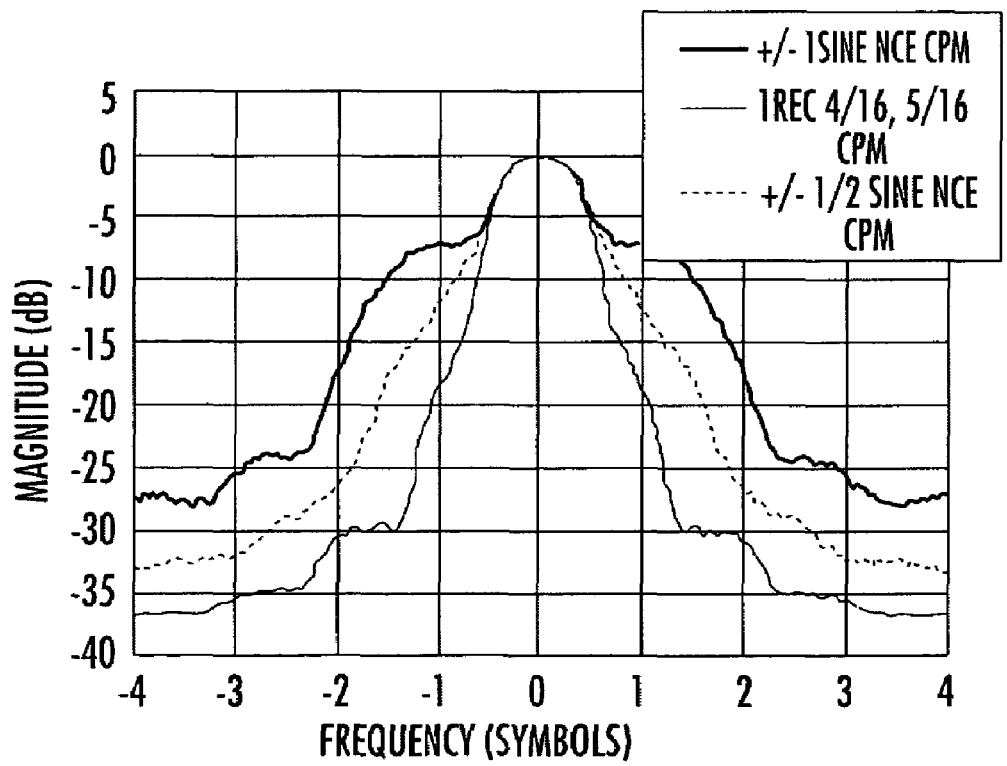
FIG. 7 is a graph showing a comparison of 8-ary hybrid CPM waveforms with 1REC CPM.

With the use of the 4-ary symbols provided by the CPM waveform and the new, extra-encoded bit, a new 8-ary hybrid CPM waveform is created. The spectrum of the 8-ary Hybrid CPM waveform is shown in FIG. 7, which shows comparison of 8-ary hybrid CPM waveforms with 1REC CPM.

As shown in the spectral plot, the modulation bandwidth increases as a function of the amplitude shaping. This bandwidth increase has a corresponding increase in power efficiency as shown in FIG. 8, which shows a comparison of 8-ary hybrid CPM to 8-ary 1REC CPM.

Figure 8:
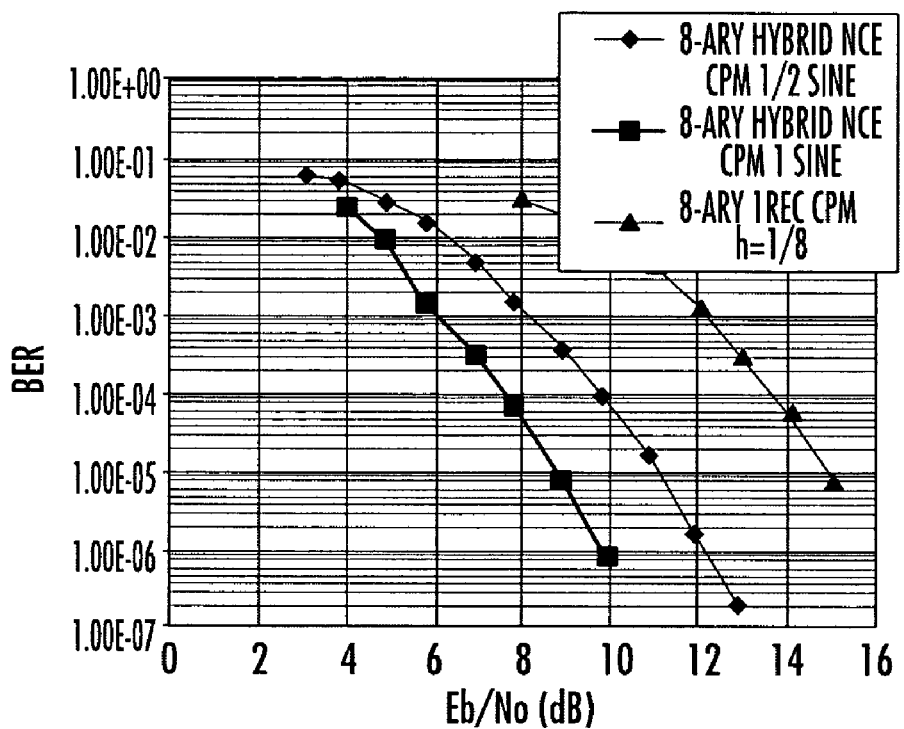
FIG. 8 is a graph showing a comparison of 8-ary hybrid CPM to 8-ary 1REC CPM.

As shown on FIG. 8, the 8-ary hybrid CPM waveform can be comprised of the sin (Fs/2) or sin (Fs) amplitude shape. The performance of the single-cycle amplitude shape is better than the half-cycle shape. The peak to average ratio for the two waveforms is approximately the same (4.5 dB). Note that incrementing the number of cycles per CPM symbol does not improve performance. Although bandwidth expansion occurs, a "hole" is left in the spectrum, which would imply that the modulation is not taking advantage of the allocated bandwidth.

Figure 9:
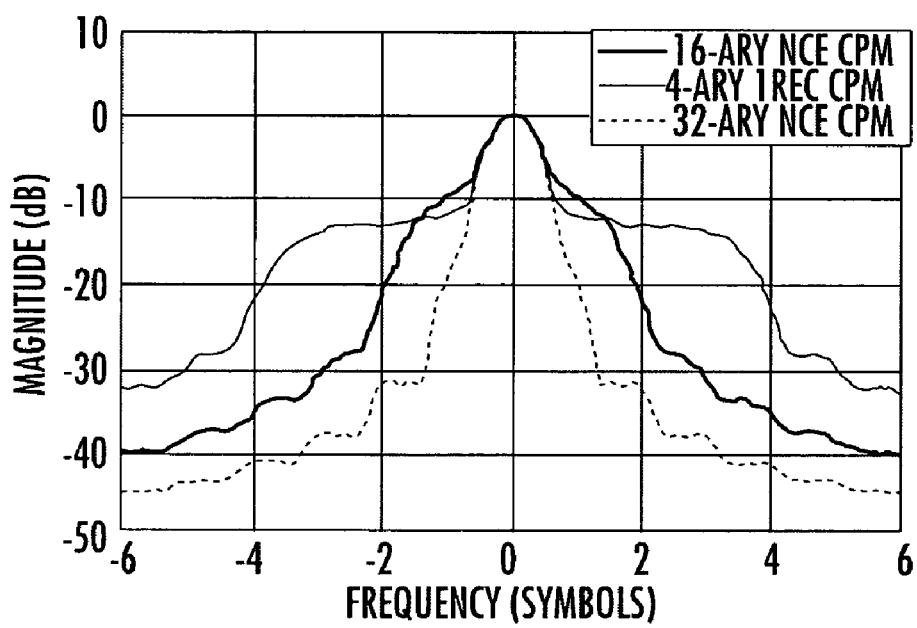
FIG. 9 is a graph showing hybrid CPM spectrum for 32-ary and 16-ary modulation.

Higher order modulation is available with an increased number of orthogonal signals. In the spectrum plot of FIG. 9, the 32-ary hybrid CPM signal is shown to have roughly twice the bandwidth of the 16-ary waveform which, in turn, has twice the bandwidth of the original 4-ary 1REC CPM waveform.

There are several methods to achieving higher order modulation with orthogonal signals. The modulation shown in FIG. 9 was created with amplitude shaping of integer frequency multiples of Table 3.

TABLE 3

Higher Order Bit Encoding

| AM Bit | Amplitude Shape |
|---|---|
| 0 | −sin (Fs/2) |
| 1 | +sin (Fs/2) |
| 2 | −sin (Fs) |
| 3 | +sin (Fs) |
| 4 | −sin (2*Fs) |
| 5 | +sin (2*Fs) |
| 6 | −sin (3*Fs) |
| 7 | +sin (3*Fs) |

The use of integer frequency multiples is only one method it is probably the least efficient method. Another method could be to use the sum of orthogonal frequencies to generate the symbol alphabet or to try a different phase offset per symbol, which could provide enough distance for the parallel path to work with the CPM trellis. Since the amplitude-coded bits are parallel, a histogram can be created of the bit error rate performance of each bit to ensure that the amplitude-coded bits have enough distance. In the cases shown, the amplitude-coding outperformed the baseline CPM trellis code. The power efficiency of the 16-ary and 32-ary hybrid CPM waveforms is shown in FIG. 10, which shows a hybrid power efficiency for 8, 16 and 32-ary hybrid CPM.

Figure 10:
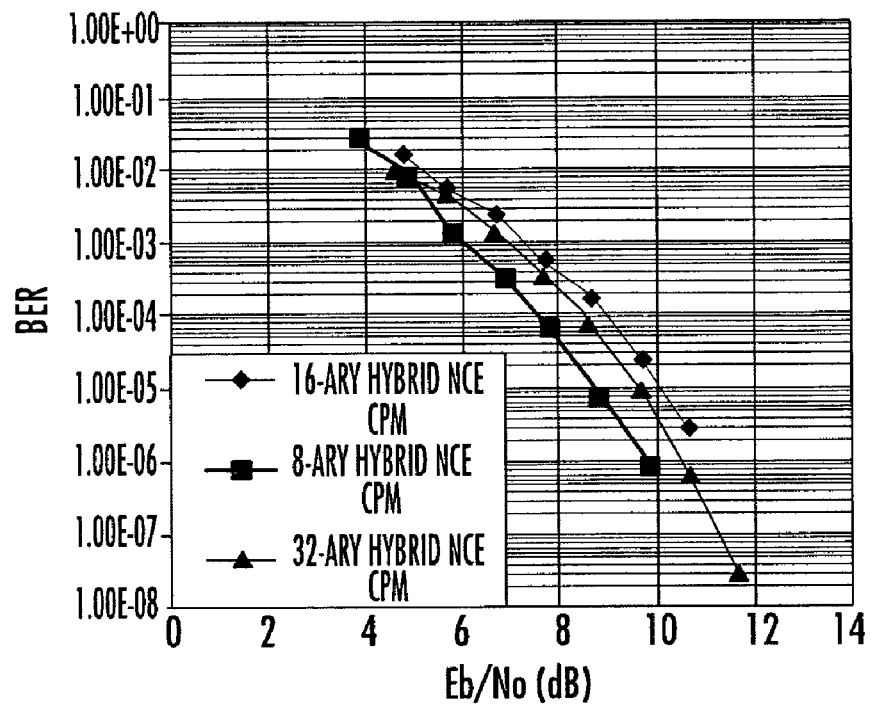
FIG. 10 is a graph showing hybrid power efficiency for 8, 16 and 32-ary hybrid CPM.

As shown in FIG. 10, the performance of the 8-ary waveform is slightly better than 16-ary and 32-ary. The 8-ary waveform uses the one-cycle per symbol amplitude shaping where the other two waveforms use the one-half cycle per symbol shape. So, the 8-ary waveform is more power efficient with the cost of a little bandwidth efficiency.

Figure 11:
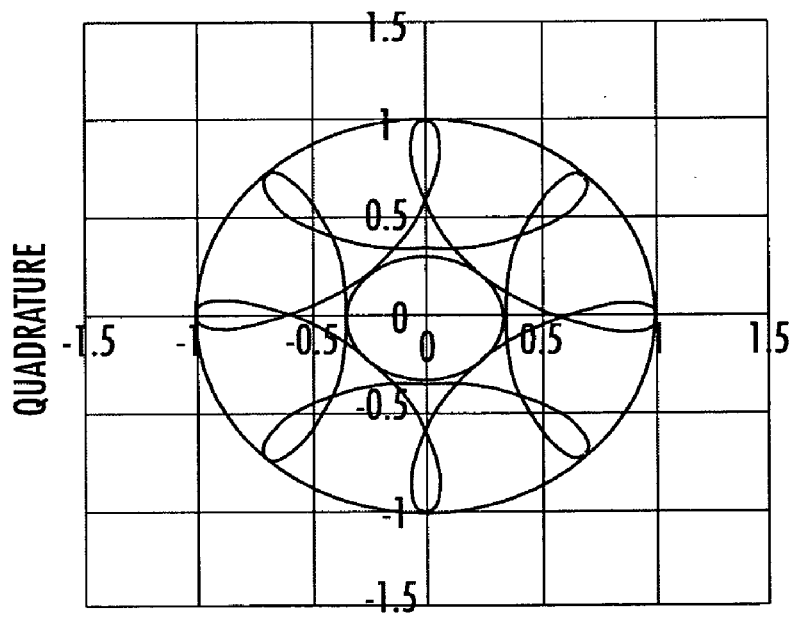
FIG. 11 is a graph showing constellation of multi-amplitude CPM h=¼.

Hybrid CPM modulation is not the only non-constant envelope CPM available. Multi-amplitude CPM modulation is comprised of both phase and amplitude components which are created using phase constellation points on multiple unit circles. A standard, two-amplitude 1REC CPM with h=½ constellation is shown in FIG. 11, which shows a constellation of multi-amplitude CPM h=¼.

Figure 12:
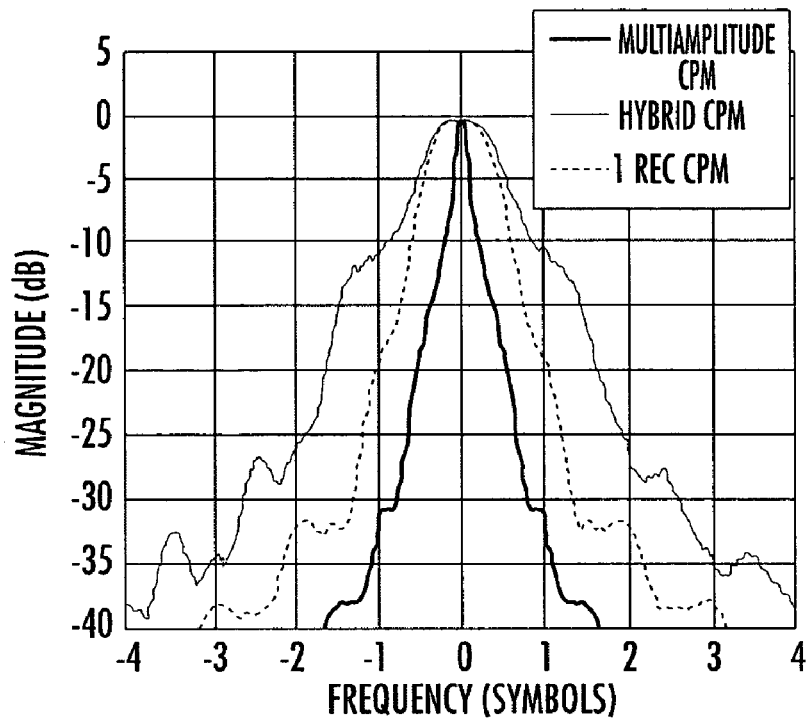
FIG. 12 is a graph showing a comparison of multi-amplitude CPM with 1REC CPM and hybrid CPM.

As shown in FIG. 12, which shows a comparison of multi-amplitude CPM with 1REC CPM and hybrid CPM. The spectrum generated by the multi-amplitude constellation is narrower than the equivalent-order 1REC CPM.

Figure 13:
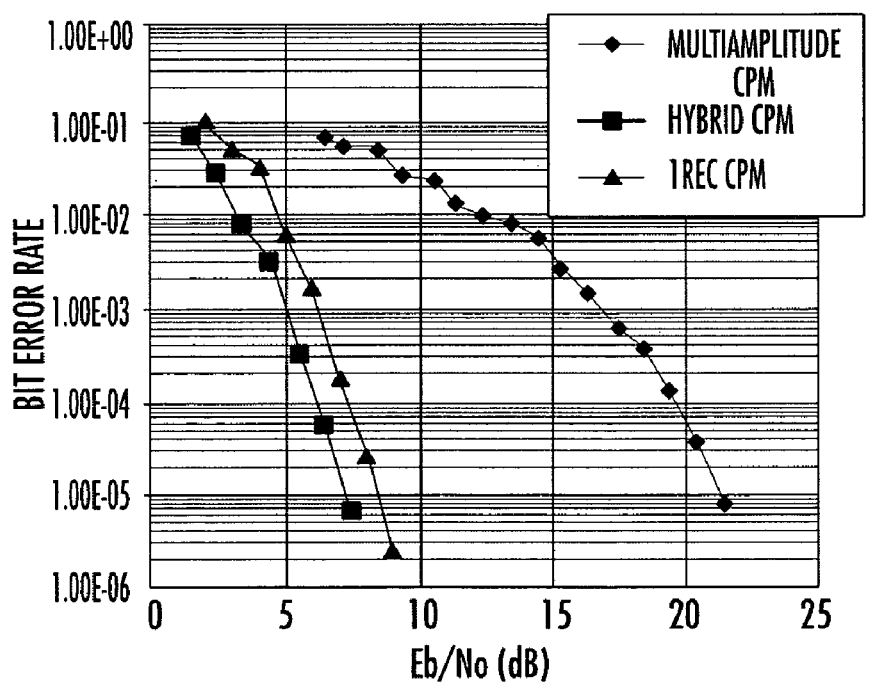
FIG. 13 is a graph showing the power efficiency of multi-amplitude CPM.

The hybrid CPM spectrum of FIG. 12 is the 4-ary 1REC multi-h {4/16, 5/16} CPM with single-cycle Amplitude shaping as shown in previous graphs. The 1REC CPM is also the same multi-h CPM shown on previous graphs for reference. The power efficiency of the multi-amplitude CPM is shown in FIG. 13, which shows power efficiency of multi-amplitude CPM.

The bandwidth/power efficiency tradeoff of the Multi-amplitude CPM is thus the opposite of the hybrid CPM modulation in that the multi-amplitude CPM waveform is narrower than the comparable 1REC CPM waveform and power performance is much worse than the 1REC CPM waveform.

Trellis-coded modulation (TCM) is another well understood modulation type. Using set partitioning, the trellis code is applied to the phase constellation so that the maximum Euclidean distance is provided for each trellis path. Unlike CPM trellis structures, the TCM trellis is generated with a convolutional code that must be adapted to each phase constellation. To generate orthogonal signals for TCM modulation, the multi-level PSK modulation must be replaced with a shaped PSK modulation (as in Table 3). For the shaped PSK signal, the phase trajectory can be modified to include the orthogonal amplitude shaping. The branch metric calculations (correlations) will provide the discrimination between the symbols of the amplitude symbol alphabet.

A single shaped QPSK signal is chosen although any higher order PSK modulation could be shaped in a similar manner. The constellation rotates every other symbol by π/4. A rate ¾, sixteen state convolutional code is selected, which has the same number of active states as the previously chosen CPM modulation.

Figure 14:
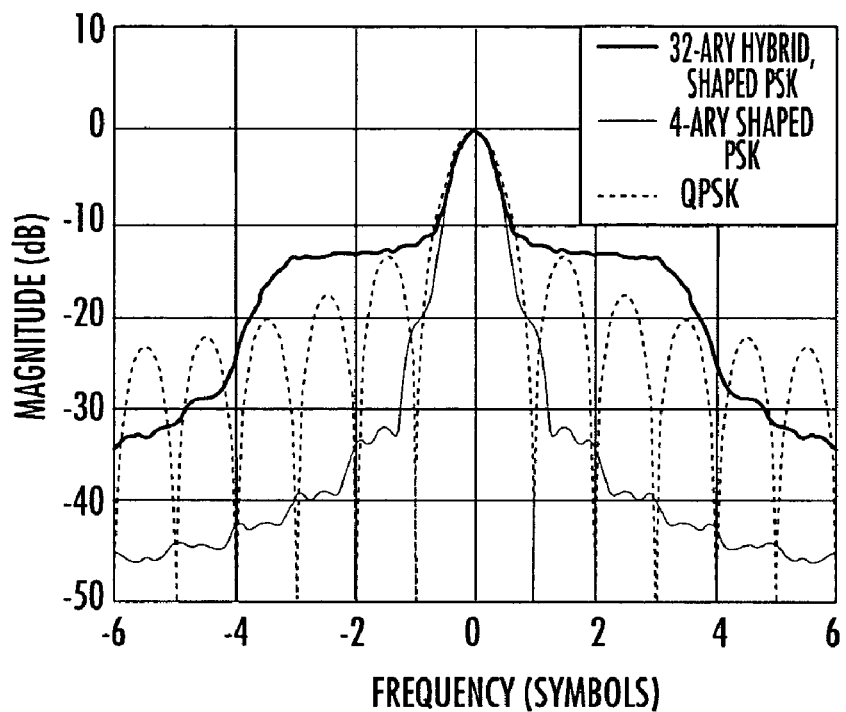
FIG. 14 is a graph showing a hybrid 32-ary TCM spectrum compared to QPSK and shaped QPSK.

In the interest of brevity and clarity, only one of the three hybrid (8, 16, and 32-ary) measured spectra is shown in FIG. 14, which shows a hybrid 32-ary TCM spectrum compared to QPSK and shaped QPSK.

Figure 15:
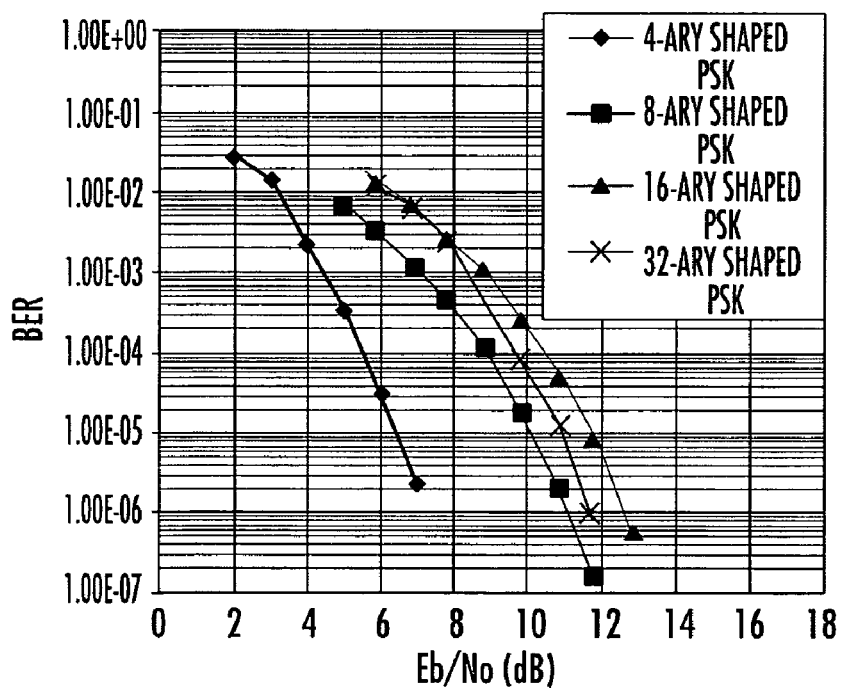
FIG. 15 is a graph showing a hybrid TCM power efficiency.

The power efficiency is shown in FIG. 15, which shows hybrid TCM power efficiency. All four hybrid TCM waveforms are shown.

The throughput of the Hybrid TCM waveforms, like that of all TCM modulated waveforms, is reduced because of the addition of the redundant parity bit(s). In the case of the 4, 8, 16, and 32-ary Shaped PSK modulations shown in FIG. 15, the throughput is reduced by a single parity bit.

The initial loss in Eb/No performance from 4-ary to the higher order modulation schemes is possibly due to the poor Euclidean distance of the parallel paths created by the orthogonal signals. A histogram of the bit errors shows that the preponderance of failures occurs in the amplitude-encoded bits. If an 8-ary PSK waveform was used as a basis for the hybrid waveform (rather than the 4-ary Shaped PSK modulation), the parallel paths would have had proportionally better Euclidean distance and provided a better match (in power efficiency) to the basis modulation.

The hybrid TCM waveforms are more bandwidth efficient than the underlying signal that they replace. Table 4 shows the improvement in bandwidth efficiency of the 8, 16, and 32-ary Hybrid TCM modulation schemes.

TABLE 4

Hybrid TCM Bandwidth Efficiency

| Modulation | Hz/Bits | % Improvement |
|---|---|---|
| 4-ary | 1.7 | N/A |
| 8-ary | 1.375 | 19% |
| 16-ary | 1.16 | 32% |
| 32-ary | 1.85 | −.09% |

The present invention is directed to the application of orthogonal signals to TCM and CPM waveforms to increase the throughput of those waveforms by generating parallel paths in the trellis structure. The bandwidth and power efficiency of several examples of higher-order modulation were shown to illustrate the properties of the hybrid signals.

It is possible that higher order orthogonal signals could be created using the sum of orthogonal signals (sin (Fs)+sin (2Fs)) rather than increasing the number of cycles per symbol for each pair of amplitude modulated symbols. Rather than correlation, an FFT could be employed in the branch metric calculation to discriminate between amplitude modulated symbols.

Branch metric computational efficiency is affected by the use of orthogonal signals to generate parallel bits. Increasing the order of the amplitude-modulated symbols also increases the complexity of the branch metrics. The correlations performed in branch metric computations are naturally calculated as multiply accumulate operations in Digital Signal Processors and FPGA's. The path metric computations calculated as part of the maximum likelihood decoding are only affected by the order of the modulation, which is the same for any modulation scheme. So, the designer has the ability to reduce the symbol rate of the hybrid TCM or CPM modulation, meet the same bandwidth requirements as the standard modulation, and reduce computation complexity because of the lowered symbol rate.

There is no limit to the number orthogonal signals which can be used to increase the order of the modulation of the underlying TCM or CPM waveform. At extreme limits, wideband waveforms could be generated which have the power efficiency of the underlying TCM or CPM waveform with similar computation efficiency as compared to a CDMA waveform with the same chip rate.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for forming an encoded signal comprising:
   a signal generator for generating a coded waveform having a trellis structure as a continuous phase modulated (CPM) signal; and
   a modulator operative with the signal generator for adding at least one orthogonal or pseudo-orthogonal waveform to a trellis structure of the coded waveform and operative for creating higher order orthogonal signals using sine amplitude signal shaping to create a non-constant envelope modulated signal that has at least one of increased bandwidth, improved bit error rate, and increased number of bits encoded into a single symbol, and wherein the modulator is operative for creating higher order orthogonal or pseudo-orthogonal signals by amplitude-modulating the underlying base CPM waveform with orthogonal or pseudo-orthogonal basis functions.

2. A system according to claim 1, wherein the modulator is operative for amplitude shaping the coded waveform with integer or non-integer frequency multiples of amplitude modulated signals.

3. A system according to claim 2, and further comprising a demodulator operative for employing a Fast Fourier Transform in branch metric computations and discriminating between amplitude modulated signals.

4. A system according to claim 2, wherein the modulator is operative for increasing the number of cycles per symbol for a pair of amplitude modulated signals.

5. A system according to claim 1, wherein the modulator is operative for increasing higher order modulation within the encoded waveform by increasing orthogonal symbols.

6. A system according to claim 1, wherein the modulator is operative for generating a symbol alphabet using a sum of orthogonal frequencies.

7. A system according to claim 6, wherein the modulator is operative for creating a multiple-ary encoded waveform using multiple-ary symbols and at least one extra-encoded amplitude modulated bit.

8. A system according to claim 7, wherein the multiple-ary encoded waveform comprises a Sin (Fs/2) amplitude shape.

9. A system according to claim 7, where the multiple-ary encoded waveform comprises a Sin (Fs) amplitude shape.

10. A system according to claim 1, wherein the modulator is operative for changing a phase offset per symbol to provide sufficient distance for a parallel path to work with a trellis structure.

11. A system according to claim 10, wherein the modulator is operative for increasing the distance between constellation points in a trellis.

12. A system for forming a hybrid continuous phase modulated signal comprising:
    a signal generator for generating a continuous phase modulated (CPM) signal; and
    a modulator operative with the signal generator for adding at least one orthogonal or pseudo-orthogonal waveform to the generated continuous phase modulated signal and operative for creating higher order orthogonal signals using sine amplitude signal shaping to create a hybrid, non-constant envelope, continuous phase modulated signal, and wherein the modulator is operative for creating higher order orthogonal or pseudo-orthogonal signals by amplitude-modulating the underlying base CPM waveform with orthogonal or pseudo-orthogonal basis functions.

13. A system according to claim 12, wherein the modulator is operative for amplitude shaping the continuous phase modulated signal with integer or non-integer frequency multiples of amplitude modulated signals.

14. A system according to claim 13, and further comprising a demodulator operative for employing a Fast Fourier Transform in branch metric computations and discriminating between amplitude modulated signals.

15. A system according to claim 13, wherein the modulator is operative for increasing the number of cycles per symbol for a pair of amplitude modulated signals.

16. A system according to claim 12, wherein the modulator is operative for increasing higher order modulation within the continuous phase modulated signal by increasing orthogonal symbols.

17. A system according to claim 12, wherein the modulator is operative for generating a symbol alphabet using a sum of orthogonal frequencies.

18. A system according to claim 17, wherein the modulator is operative for creating a multiple-ary encoded waveform using multiple-ary symbols and at least one extra-encoded amplitude modulated bit.

19. A system according to claim 18, wherein the multiple-ary encoded waveform comprises a Sin (Fs/2) amplitude shape.

20. A system according to claim 18, wherein the multiple-ary waveform comprises a Sin (Fs) amplitude shape.

21. A system according to claim 12, wherein the modulator is operative for changing a phase offset per symbol to provide sufficient distance for a parallel path to work with a trellis.

22. A system according to claim 21, wherein the modulator is operative for increasing the distance between constellation points in a trellis.

23. A method of forming an encoded modulated signal, which comprises:
    generating within a signal generator of a radio a coded waveform having a trellis structure and modulating the generated signal within a modulator by adding at least one orthogonal or pseudo-orthogonal waveform to a trellis structure of the coded waveform as a continuous phase modulated (CPM) signal and creating higher order orthogonal signals using sine amplitude signal shaping to create a non-constant envelope modulated signal that has at least one of increased bandwidth, improved bit error rate, and an increased number of bits encoded into a single symbol; and
    creating higher order orthogonal or pseudo-orthogonal signals by amplitude-modulating within the modulator the underlying base CPM waveform with orthogonal or pseudo-orthogonal basis functions.

24. A method according to claim 23, which further comprises amplitude shaping the coded waveform with integer frequency multiples of amplitude modulated signals.

25. A method according to claim 24, which further comprises employing a Fast Fourier Transform in branch metric computations and discriminating between amplitude modulated signals in a demodulator.

26. A method according to claim 24, which further comprises increasing the number of cycles per symbol for a pair of amplitude modulated signals.

27. A method according to claim 23, which further comprises increasing higher order modulation within the encoded waveform by increasing orthogonal symbols.

28. A method according to claim 27, which further comprises generating a symbol alphabet using a sum of orthogonal frequencies.

29. A method according to claim 28, which further comprises creating a multiple-ary encoded waveform using multiple-ary symbols and an extra-encoded amplitude modulated bit.

30. A method according to claim 29, wherein the multiple-ary encoded waveform comprises a Sin (Fs) amplitude shape.

31. A method according to claim 29, wherein the multiple-ary encoded waveform comprises a Sin (Fs) amplitude shape.

32. A method according to claim 23, which further comprises changing a phase offset per symbol to provide sufficient distance for a parallel path to work with a trellis.

33. A method according to claim 23, which further comprises increasing the distance between constellation points in a trellis.

34. A method of forming a hybrid continuous phase modulated (CPM) signal, which comprises:
generating within a signal generator of a radio a coded waveform having a trellis structure and modulating the generated signal within a modulator by adding at least one orthogonal or pseudo-orthogonal waveform to the continuous phase modulated signal and creating higher order orthogonal signals using sine amplitude signal shaping to create a non-constant envelope continuous phase modulated signal; and
creating higher order orthogonal or pseudo-orthogonal signals by amplitude-modulating within the modulator the underlying base CPM waveform with orthogonal or pseudo-orthogonal basis functions.

35. A method according to claim 34, which further comprises amplitude shaping the continuous phase modulated signal with integer frequency multiples of amplitude modulated signals.

36. A method according to claim 35, which further comprises employing a Fast Fourier Transform in branch metric computations and discriminating between amplitude modulated signals in a demodulator.

37. A method according to claim 35, which further comprises increasing the number of cycles per symbol for a pair of amplitude modulated signals.

38. A method according to claim 34, which further comprises increasing higher order modulation within the continuous phase modulated signal by increasing orthogonal symbols.

39. A method according to claim 38, which further comprises generating a symbol alphabet using a sum of orthogonal frequencies.

40. A method according to claim 39, which further comprises creating a multiple-ary continuous phase modulated waveform using multiple-ary symbols and an extra-encoded amplitude modulated bit.

41. A method according to claim 40, wherein the multiple-ary continuous phase modulated waveform comprises a Sin (Fs/2) amplitude shape.

42. A method according to claim 40, where the multiple-ary continuous phase modulated waveform comprises a Sin (Fs) amplitude shape.

43. A method according to claim 34, wherein said continuous phase modulated signal comprises a trellis modulated signal.

44. A method according to claim 43, which further comprises changing a phase offset per symbol to provide sufficient distance for a parallel path to work with a continuous phase modulated trellis.

45. A method according to claim 43, which further comprises increasing the distance between constellation points in the trellis.

46. A method of forming a hybrid continuous phase modulated (CPM) signal, which comprises:
generating within a signal generator of a radio a coded waveform having a trellis structure and modulating the generated signal within a modulator by adding at least one orthogonal or pseudo-orthogonal waveform to a continuous phase modulated signal;
sine amplitude shaping the signal within the modulator and creating higher order orthogonal signals using sine amplitude signal shaping to create a non-constant envelope continuous phase modulated signal; and
creating higher order orthogonal or pseudo-orthogonal signals by amplitude-modulating within the modulator the underlying base CPM waveform with orthogonal or pseudo-orthogonal basis functions.

47. A method according to claim 46, which further comprises replacing a constant radius continuous phase modulated signal shape with a one-half sine wave amplitude.

48. A method according to claim 46, which further comprises using a radius that is equal to a constant minus the amplitude shape for clockwise symbols.

49. A method according to claim 46, which further comprises using a radius that is equal to a constant plus an amplitude shape for counter-clockwise symbols.

50. A method according to claim 46, which further comprises amplitude shaping the continuous phase modulated signal with integer frequency multiples of amplitude modulated signals.

51. A method according to claim 50, which further comprises employing a Fast Fourier Transform in branch metrics and discriminating between amplitude modulated signals in a demodulator.

52. A method according to claim 46, which further comprises increasing the number of cycles per symbol for a pair of amplitude modulated signals.

53. A method according to claim 46, which further comprises increasing higher order modulation within the continuous phase modulated signal by increasing orthogonal symbols.

54. A method according to claim 53, which further comprises generating a symbol alphabet using a sum of orthogonal frequencies.

55. A method according to claim 54, which further comprises creating a multiple-ary continuous phase modulated waveform using multiple-ary symbols and an extra-encoded amplitude modulated bit.

56. A method according to claim 55, wherein the multiple-ary continuous phase modulated waveform comprises a Sin (Fs/2) amplitude shape.

57. A method according to claim 55, wherein the multiple-ary continuous phase modulated waveform comprises Sin (Fs) amplitude shape.

58. A method according to claim 53, wherein said continuous phase modulated signal comprises a trellis modulated signal.

59. A method according to claim 58, which further comprises changing a phase offset per symbol to provide sufficient distance for a parallel path to work with a continuous phase modulated trellis.

60. A method according to claim 58, which further comprises increasing the distance between constellation points in the trellis.

* * * * *